US012548567B2

(12) United States Patent
Mizuno et al.

(10) Patent No.: US 12,548,567 B2
(45) Date of Patent: Feb. 10, 2026

(54) INFORMATION PROCESSING DEVICE, INFORMATION PROCESSING METHOD, AND RECORDING MEDIUM

(71) Applicant: Casio Computer Co., Ltd., Tokyo (JP)

(72) Inventors: Kimiyasu Mizuno, Akishima (JP); Keiichi Sakurai, Akishima (JP); Hideo Suzuki, Ome (JP); Koki Nakamura, Sakado (JP); Karen Suzuki, Musashino (JP); Bing Yu, Koganei (JP)

(73) Assignee: Casio Computer Co., Ltd., Tokyo (JP)

(*) Notice: Subject to any disclaimer, the term of this patent is extended or adjusted under 35 U.S.C. 154(b) by 244 days.

(21) Appl. No.: 18/348,190

(22) Filed: Jul. 6, 2023

(65) Prior Publication Data
US 2024/0021198 A1    Jan. 18, 2024

(30) Foreign Application Priority Data

Jul. 13, 2022 (JP) .................................. 2022-112362

(51) Int. Cl.
*G10L 15/22* (2006.01)

(52) U.S. Cl.
CPC ........ *G10L 15/22* (2013.01); *G10L 2015/223* (2013.01)

(58) Field of Classification Search
CPC .... G10L 15/22; G10L 2015/223; G06F 3/167
See application file for complete search history.

(56) References Cited

U.S. PATENT DOCUMENTS 11,430,447 B2 *  8/2022  Sinha ..................... G06V 40/10
11,615,784 B2 *  3/2023  Gao ........................ G10L 15/08
                                                          704/251

(Continued)

FOREIGN PATENT DOCUMENTS

CN    110140168 A    8/2019
CN    112204507 A    1/2021

(Continued)

OTHER PUBLICATIONS

Notice of Reasons for Refusal, dated May 2, 2024, for Japanese Patent Application No. 2022-112362. (10 pages) (with English Translation).

*Primary Examiner* — Daniel Abebe
(74) *Attorney, Agent, or Firm* — Seed Intellectual Property Law Group LLP

(57) ABSTRACT

An information processing device includes a microphone that acquires a speech signal, and at least one processor. In a case in which the processor determines a wake word is included in first recognition data derived from the speech signal, when the processor determines that control information, that is information related to a control processing, is included in second recognition data derived from the speech signal after the wake word, the processor executes a first control processing corresponding to the control information. When the processor determines that the control information is included in third recognition data derived from the speech signal acquired by the microphone during a first period after a predetermined condition related to an event that occurs after the wake word is satisfied or during execution of the first control processing, the processor executes a second control processing corresponding to the control information included in the third recognition data.

13 Claims, 12 Drawing Sheets

(56) References Cited

U.S. PATENT DOCUMENTS

| | | | | |
|---|---|---|---|---|
| 11,735,181 B2* | 8/2023 | Ueno | ................ | G06F 3/167 |
| | | | | 704/251 |
| 2018/0182390 A1 | 6/2018 | Hughes et al. | | |
| 2021/0216134 A1 | 7/2021 | Fukunaga et al. | | |
| 2021/0241765 A1* | 8/2021 | Ueno | ................ | G10L 15/22 |
| 2022/0084518 A1 | 3/2022 | Tanaka | | |
| 2023/0119489 A1* | 4/2023 | Han | ................ | G10L 15/08 |
| | | | | 704/251 |

FOREIGN PATENT DOCUMENTS

| | | | |
|---|---|---|---|
| JP | 2001154694 A | | 6/2001 |
| JP | 2017142651 A | | 8/2017 |
| JP | 2019086535 A | | 6/2019 |
| JP | 2021009190 A | | 1/2021 |
| JP | 2021015281 A | | 2/2021 |
| JP | 2021124613 A | | 8/2021 |
| JP | 2021144259 A | | 9/2021 |
| JP | WO2020145071 A1 | | 11/2021 |
| KR | 10-2019-0100334 A | | 8/2019 |
| KR | 102098633 B1 * | | 8/2020 |

* cited by examiner

FIG. 7

| EXTRACTION PARAMETER | USER SPEECH | START UP APPLICATION |
|---|---|---|
| AMOUNT OF TIME | TIMER | TIMER FOR THAT AMOUNT OF TIME |
| NAME OF WAY TO CUT VEGETABLE | HOW TO CUT | VIDEO SEARCH OF THAT WAY TO CUT VEGETABLE |
| NAME OF WAY TO FILLET FISH | HOW TO FILLET | VIDEO SEARCH OF THAT WAY TO FILLET FISH |
| NAME OF FOOD OTHER THAN COOKING | DESCRIPTION | VIDEO SEARCH OF DESCRIPTION OF THAT FOOD |
| URL | DISPLAY | DISPLAY PAGE OF THAT URL |
| ADDRESS, LOCATION NAME, FACILITY NAME, OR THE LIKE | MAP | MAP OF VICINITY OF THAT ADDRESS OR THE LIKE |
| NAME OF TYPE OF TENT | SETUP METHOD | VIDEO SEARCH OF SETUP METHOD OF THAT TENT |
| NAME OF TYPE OF TARP | SETUP METHOD | VIDEO SEARCH OF SETUP METHOD OF THAT TARP |
| NAME OF COOKING TOOL | SETUP METHOD | VIDEO SEARCH OF SETUP METHOD OF THAT COOKING TOOL |
| NAME OF CAMPFIRE PIT | SETUP METHOD | VIDEO SEARCH OF SETUP METHOD OF THAT CAMPFIRE PIT |
| NAME OF OUTDOOR COOKING | HOW TO MAKE | VIDEO SEARCH OF HOW TO MAKE THAT COOKING |
| ⋮ | ⋮ | ⋮ |

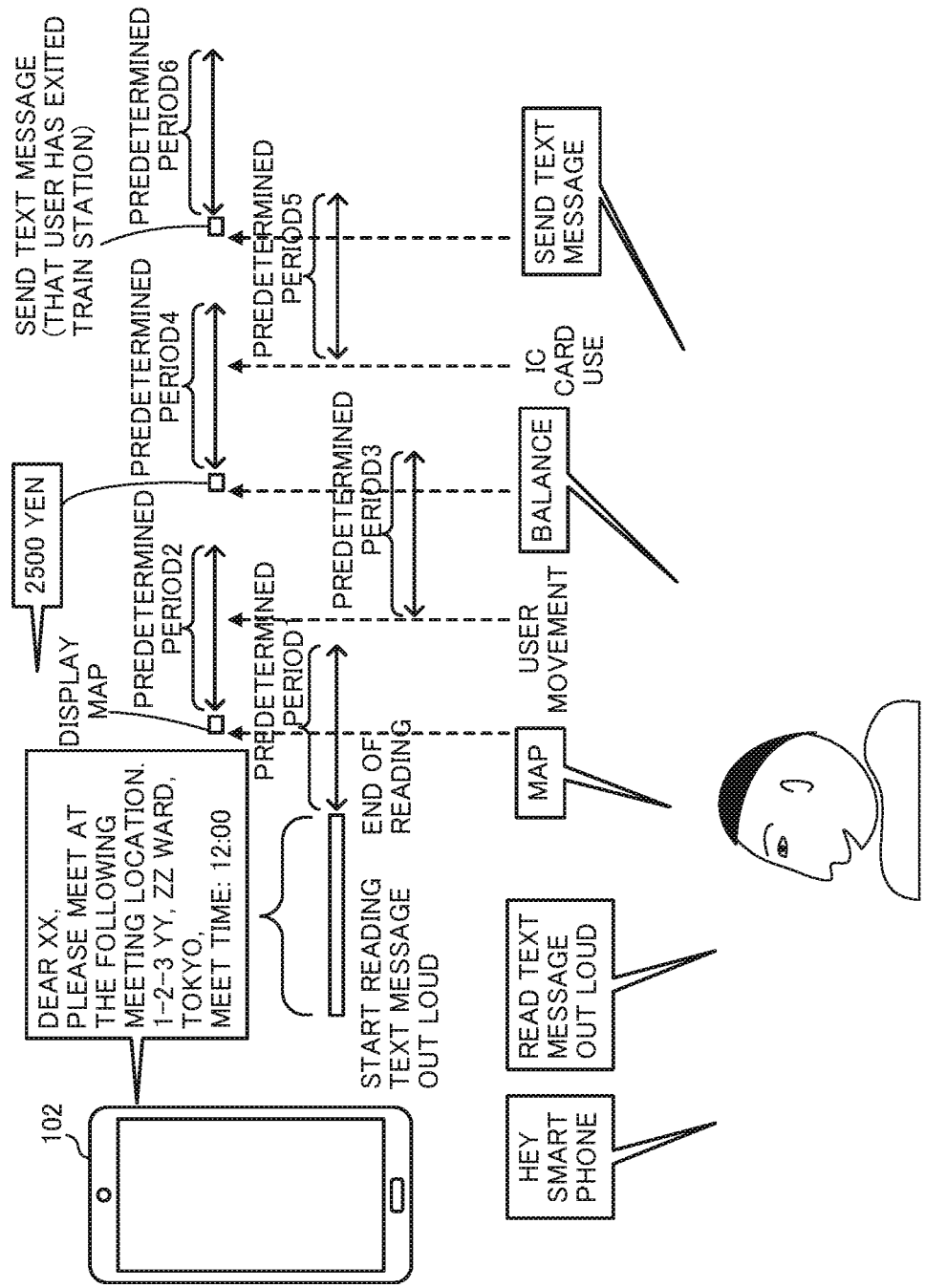

FIG. 10

| EXECUTION ENDED APPLICATION | USER ACTION | USER SPEECH | START UP APPLICATION |
|---|---|---|---|
| MAP | MOVEMENT OR NAVIGATION START | | |
| BALANCE OUTPUT | IC CARD USE | BALANCE | BALANCE OUTPUT (OF TRANSPORTATION IC CARD) |
| ... | ... | SEND TEXT MESSAGE | SEND TEXT MESSAGE (THAT USER HAS EXITED TRAIN STATION) |
| NAVIGATION | ARRIVAL AT CAMPSITE XX | ... | ... |
| VIDEO SEARCH OF CAMP | MOVED BODY | CAMP VIDEO | VIDEO SEARCH OF CAMP |
| VIDEO PLAYBACK OF SETUP | BODY STOPPED | NAME OF OBJECT TO BE SETUP | VIDEO PLAYBACK OF SETUP (OF OBJECT TO BE SETUP) |
| VIDEO PLAYBACK OF SETUP | BODY STOPPED | NAME OF OBJECT TO BE SETUP | VIDEO PLAYBACK OF SETUP (OF OBJECT TO BE SETUP) |
| ... | ... | NAME OF COOKING | VIDEO SEARCH OF HOW TO MAKE (COOKING) |
| | | ... | ... |

122

INFORMATION PROCESSING DEVICE, INFORMATION PROCESSING METHOD, AND RECORDING MEDIUM

CROSS-REFERENCE TO RELATED APPLICATIONS

This application claims the benefit of Japanese Patent Application No. 2022-112362, filed on Jul. 13, 2022, the entire disclosure of which is incorporated by reference herein.

FIELD OF THE INVENTION

This application relates generally to an information processing device, an information processing method, and a non-transitory recording medium.

BACKGROUND OF THE INVENTION

In devices that recognize speech such as smart speakers and smartphones, when a user utters a so-called wake word, the device can respond to subsequent voice commands by of the user. For example, the device can respond to the speech of the user, start up various application programs in accordance with commands of the user, and the like. Additionally, Unexamined Japanese Patent Application Publication No. 2019-86535 describes a technology in which it is possible to selectively use a plurality of cloud services by using a plurality of wake words.

SUMMARY OF THE INVENTION

An aspect of an information processing device according to the present disclosure that achieves the objective described above includes:
a microphone that acquires a speech signal; and
at least one processor, wherein
in a case in which the processor determines that a wake word is included in first recognition data derived from the speech signal,
when the processor determines that control information, that is information related to a control processing, is included in second recognition data derived from the speech signal after the wake word, the processor executes a first control processing corresponding to the control information, and
when the processor determines that the control information is included in third recognition data derived from the speech signal acquired by the microphone during a first period after a predetermined condition related to an event that occurs after the wake word is satisfied or during execution of the first control processing, the processor executes a second control processing corresponding to the control information included in the third recognition data.

BRIEF DESCRIPTION OF DRAWINGS

A more complete understanding of this application can be obtained when the following detailed description is considered in conjunction with the following drawings, in which:
FIG. 7 is a drawing illustrating an example of an extraction parameter table according to Embodiment 2;
FIG. 9 is a drawing illustrating an example of operations when a user issues commands, by voice, to an information processing device according to Embodiment 3;
FIG. 10 is a drawing illustrating an example of an action table according to Embodiment 3.

DETAILED DESCRIPTION OF THE INVENTION

Figure 1:
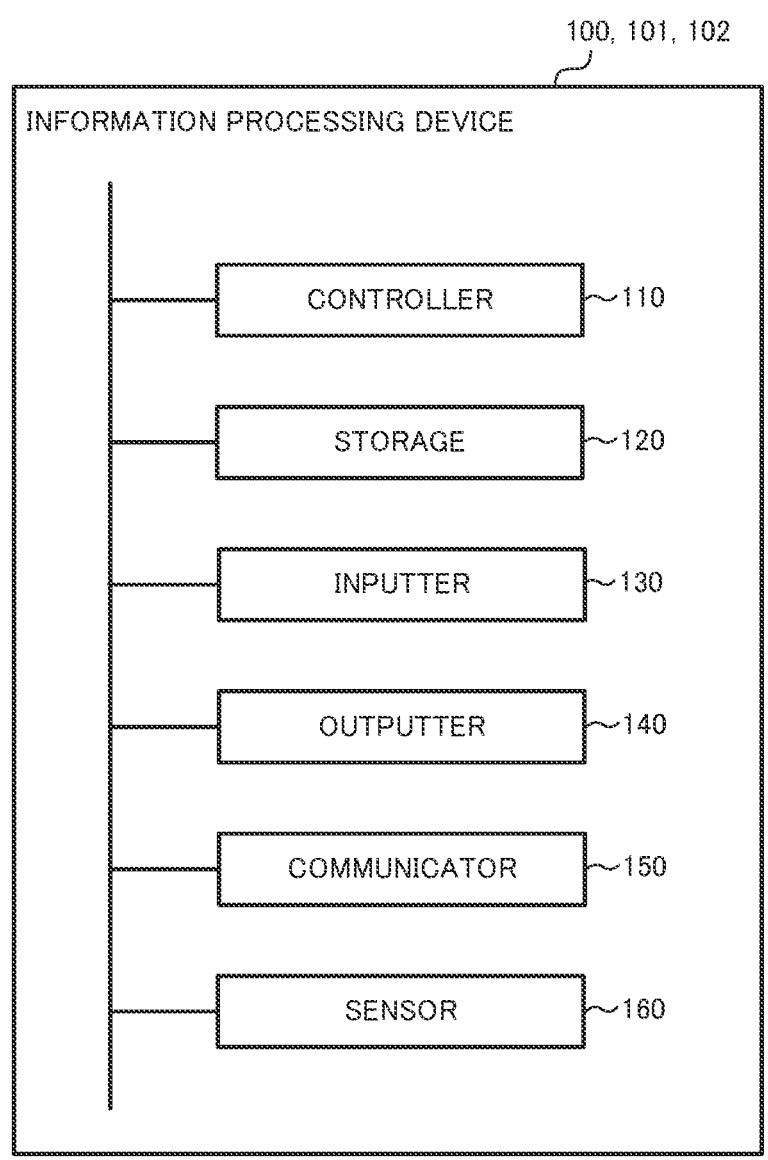
FIG. 1 is a block diagram illustrating an example of the functional configuration of an information processing device according to Embodiment 1.

An information processing device according to various embodiments is described while referencing the drawings. Note that, in the drawings, identical or corresponding components are denoted with the same reference numerals.

Embodiment 1

An information processing device according to Embodiment 1 is an electronic device, for example, a smartphone, in which a user can issue various commands (start up of various application programs, and the like) by voice.

As illustrated in FIG. 1, an information processing device 100 includes a controller 110, a storage 120, an inputter 130, an outputter 140, a communicator 150, and a sensor 160.

In one example, the controller 110 is configured from a processor such as a central processing unit (CPU) or the like. The controller 110 executes, by a program stored in the storage 120, processing for realizing the various functions of the smartphone, hereinafter described voice command recognition processing, and the like. The controller 110 is compatible with multithreading, and can execute a plurality of processes in parallel.

The storage 120 stores programs to be executed by the controller 110 and necessary data. The storage 120 may include random access memory (RAM), read-only memory (ROM), flash memory, or the like, but is not limited thereto. Note that the storage 120 may be provided inside the controller 110.

The inputter 130 is a user interface such as a microphone, a push button switch, a touch panel, or the like, and receives operation inputs from the user. When the inputter 130 includes a touch panel, the touch panel may be implemented as a touch panel that is integrated with a display of the outputter 140. The microphone, which is an example of a speech input device, functions as a speech acquirer that acquires a speech signal.

The outputter 140 includes a display such as a liquid crystal display, an organic electro-luminescence (EL) display, or the like, and displays display screens, operation screens, and the like that provide the functions of the information processing device 100. Additionally, the outputter 140 includes a speech outputting means such as a speaker or the like and can read text messages, for example, out loud. Moreover, the outputter 140 may include a vibrator that generates vibration.

In one example, the communicator 150 is implemented as network interface that is compatible with a wireless local area network (LAN), long term evolution (LTE), or the like. The information processing device 100 can communicate with the internet and other information processing devices via the communicator 150.

The sensor 160 includes devices that detect various values related to the movement of the user and the surrounding environment. Examples of the devices include a heart rate sensor, a temperature sensor, a barometric pressure sensor, an acceleration sensor, a gyrosensor, a global positioning system (GPS) device, and the like. The controller 110 can acquire, as detected values and at desired timings, the values detected by the various devices of the sensor 160. However, a configuration is possible in which the sensor 160 does not include all of the sensors described above and, for example, may include the temperature sensor and the barometric pressure sensor.

In one example, the heart rate sensor detects a pulse by a photoplethysmography (PPG) sensor that includes a light emitting diode (LED) and a photodiode (PD). The controller 110 can acquire, on the basis of a pulse wave detected by the heart rate sensor, the heart rate by measuring a pulse rate (heart rate) per unit time (for example, one minute). In one example, the temperature sensor includes a thermistor, and can measure a body temperature. In one example, the barometric pressure sensor includes a piezoresistive integrated circuit (IC), and can measure the ambient barometric pressure.

The acceleration sensor detects acceleration, in each direction of three orthogonal axes (X axis, Y axis, Z axis), of the information processing device 100. The gyrosensor detects an angular velocity of rotation, with each of the three orthogonal axes (X axis, Y axis, Z axis) as the rotation axis, of the information processing device 100. The GPS device acquires a current position (for example, three-dimensional data including latitude, longitude, and altitude) of the information processing device 100.

When issuing a command by voice to the information processing device 100, fundamentally, the user utters a key phrase or a key word called a "wake word" ("OK Google", "Hey Siri", or the like), and then utters the content of the command. By causing the user to utter the wake word, the information processing device 100 prevents erroneous recognition of speech that is not a command directed at the information processing device 100 (for example, conversation among family members, speech from a television, and the like).

However, in a situation in which it is clear that a command is being issued to the information processing device 100 by voice (for example, a situation in which consecutive commands are expected), uttering the wake word becomes an extra effort to the user. Information processing devices exist that accept commands by voice after the pressing of a button instead of uttering the wake word, but such devices are inconvenient when the user has dirty hands, such as when cooking or the like, and does not want to touch the screen or button. To address this, the information processing device 100 accepts voice commands without the wake word in situations in which a command is expected to be issued by voice.

Figure 2:
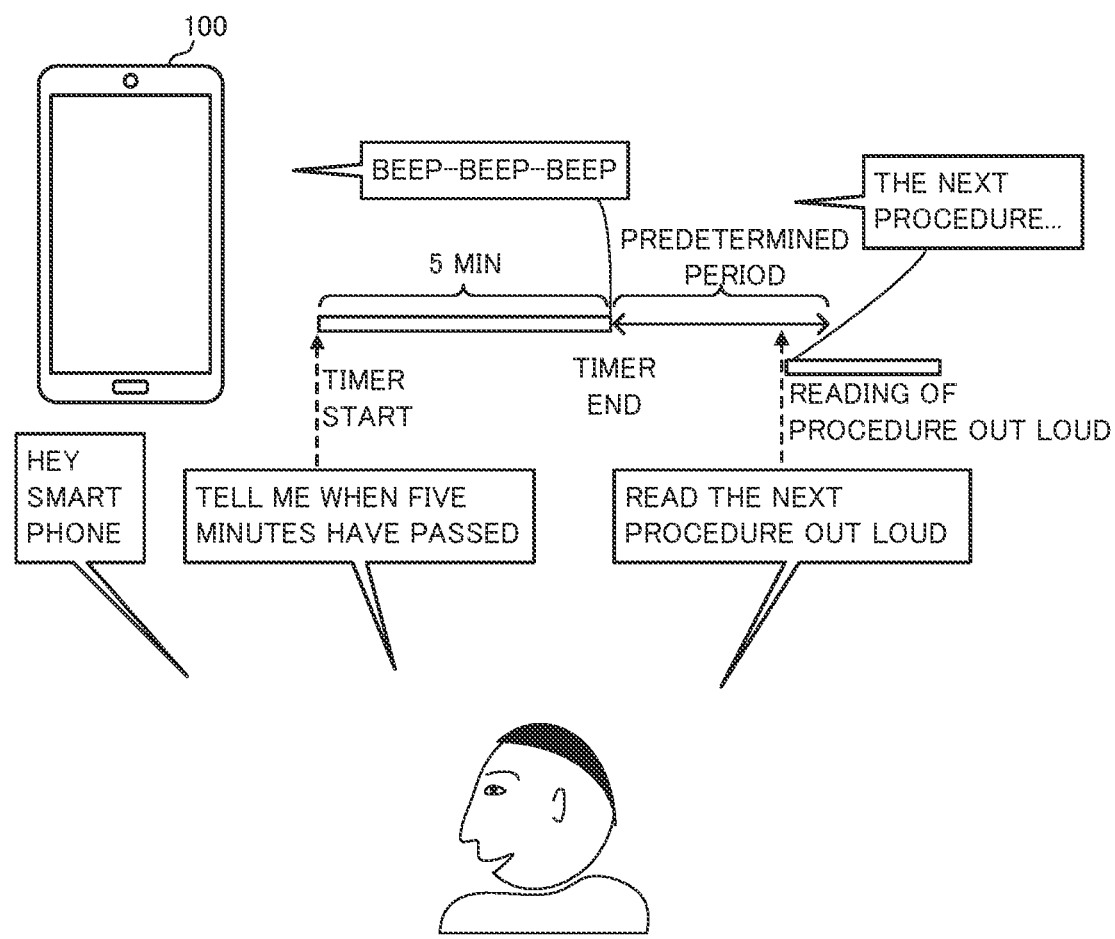
FIG. 2 is a drawing illustrating an example of operations when a user issues commands, by voice, to the information processing device according to Embodiment 1.

For example, in the example illustrated in FIG. 2, the user first utters the wake word (in this example, "Hey smartphone"), and then utters "tell me when five minutes have passed." As a result, the information processing device 100 starts a timer. Note that commands that the user utters after the wake word are also called "voice commands." The phrase "tell me when five minutes have passed" is an example of a voice command. Additionally, the information processing device 100 executes some sort of control processing (for example, an application program) in accordance with the voice command. As such, the voice command is also called "control information related to a control processing." In the example illustrated in FIG. 2, the information processing device 100 that recognizes the voice command starts a timer as the application program, sets five minutes as a timer time, and starts the set timer.

Returning in FIG. 2, after the five minutes elapse, the information processing device 100 emits a sound of beep-beep-beep to notify the user that the five minutes have elapsed, and accepts a next command (voice command) without the wake word for a predetermined period (for example, one minute) after the end of the execution of the timer. In this example, the user issues a command of "read the next procedure out loud" without the wake word, and the information processing device 100 accepts that command and reads, out loud, a text sentence set as the next procedure.

In this example, it is thought that there is a high possibility of the user issuing some other command to the information processing device 100 after the end the execution of the timer and, as such, the information processing device 100 accepts commands (voice commands) without the wake word for the predetermined period after the end of the execution of the timer.

Figure 3:
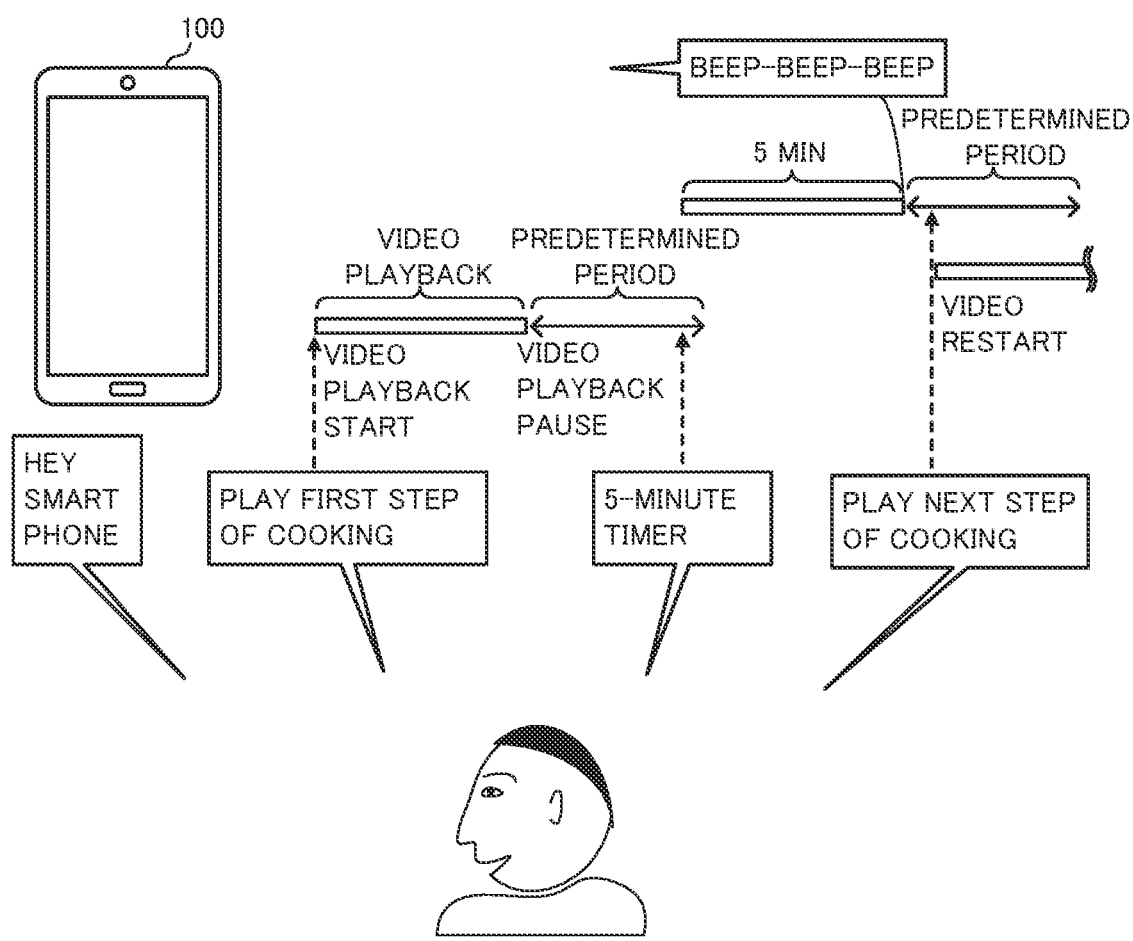
FIG. 3 is a drawing illustrating another example of operations when the user issues commands, by voice, to the information processing device according to Embodiment 1.

In the example illustrated in FIG. 3, the user first utters the wake word, and then utters "play the first step of the cooking." As a result, the information processing device 100 starts playback of a video (movie) portion, of an instructional video of the cooking, corresponding to the first step. Moreover, it is assumed that, when the information processing device 100 detects a chapter provided at the end of the video portion, of the instructional video, corresponding to the first step, the information processing device 100 pauses the playback. Note that the term "chapter" refers to a division assigned to a transition or the like between scenes in a video (movie). For example, when a certain video is made up of a plurality of elements, in the video content, chapters are provided at predetermined points on a time axis. Examples of the predetermined points include a table of contents start point, a first step start point, a first step end point (same as a second step start point), and a second step end point. Here, for example, it is assumed that the instructional video includes a procedure of simmering for five minutes. When the user desires to work according to the procedure of the instructional video, it is expected that, the user will issue a command of "five-minute timer" or the like to the information processing device 100 at the point in time at which the simmering begins and, as such, in the example illustrated in FIG. 3, the user is issuing a command of "five-minute timer."

Then, after the five minutes elapse, the information processing device 100 emits a sound of beep-beep-beep to notify the user that the five minutes have elapsed, and accepts commands without the wake word for the predetermined period (for example, one minute) after the end of the execution of the timer. In this example, the user issues a command of "play the next step of the cooking" without the wake word, and the information processing device 100 accepts that command and starts playback of a video portion, of the instructional video of the cooking, corresponding to the next step.

In this example, it is thought that there is a high possibility of the user issuing, in accordance with the procedure of the cooking, some other command to the information processing device 100 after the playback of the video portion corresponding to each step of the instructional video and after the end of the execution (expiration) of the timer. As such, the information processing device 100 accepts the next command without the wake word for the predetermined period after the end of the execution of the command issued by voice (voice command of timer, video playback, or the like).

As illustrated in FIGS. 2 and 3, when the user issues a predetermined voice command to the information processing device 100, there is a high possibility of the user issuing another voice command after the end of the execution of the application program executed in accordance with that voice command. As such, the wake word is required when the information processing device 100 first receives a voice command from the user, but the information processing device 100 accepts voice commands without the wake word for the predetermined period after the predetermined voice command after the wake word is executed. Examples of the predetermined voice command include timer, play video, pause video, end video, and the like. That is, for the first voice command, the information processing device 100 acquires the wake word and the voice command, and executes processing (timer, video playback, or the like) corresponding to the first voice command. For the predetermined period after the execution of the processing corresponding to the first voice command ends (is stopped), the information processing device 100 accepts subsequent voice commands without the wake word.

The predetermined period in which voice commands are accepted without the wake word may be a fixed length (for example, one minute), or may be changed according to the content of the voice command (the content and type of the application program started up in accordance with the voice command). For example, when the application program to be executed in accordance with the voice command is a timer of one minute or shorter, it is thought that there is a high possibility of the user uttering the next voice command immediately after the expiration of the timer and, as such, the predetermined period may be set to a short period (for example, 30 seconds). Conversely, when the application program to be started up in accordance with the voice command is a timer of five minutes or longer, it is thought that there is a high possibility of the user engaging in different work and not noticing that the timer has expired and, as such, the predetermined period may be set to a long period (for example, three minutes). Additionally, the predetermined period may be set to an amount of time proportional to an amount of time required for the execution of the application program started up in accordance with the voice command to end. When setting the predetermined period to, for example, half of the amount of amount of time required for the execution to end, the predetermined period after the five minute timer is 2.5 minutes, and the predetermined period after playing a video having a length of two minutes is one minute.

The predetermined period may be set on the basis of the type of application executed in accordance with the voice command. For example, in an instructional video teaching how to cook, when playback is paused at a division of a certain step (the chapter provided at the first step end point), there is a possibility that the user has not completed the work according to the instruction content and, as such, the predetermined period may be set to three minutes, which is longer than a default period (for example, one minute). Additionally, the information processing device 100 may set the length of the predetermined period in accordance with the type of instructional video (how to cook, how to draw, practice methods and skill training for sports such as soccer, and the like). In such a case, the information processing device 100 may acquire title and tag information (hashtags or the like) set in the instructional video to change and set the length of the predetermined period on the basis of the type of the instructional video. For example, the information processing device 100 may change and set the predetermined period to three minutes when the instructional video is a how to cook video, and to two minutes when the instructional video is a practice method video.

Additionally, the predetermined period may be changed in accordance with the type of the application program predicted to be started up next. When performing such processing, the controller 110 stores, in the storage 120, a history of the application programs started up in accordance with the voice commands. Moreover, the controller 110 can, on the basis of this history, predict, as the application program that will be started up next, the application program that has been started up the greatest number of times from among application programs that have been started up after the application program that is started in accordance with the current voice command and is being executed.

Additionally, a date and time (time stamp) at which that application program was started up, and the like may be recorded in the history, and the predetermined period may be determined on the basis of a difference in the start up time stamp of each application program (for example, for every application, an average or the like of the amount of time from the end of the execution of an immediately preceding application to when that application is started in accordance with the voice command may be calculated, and the predetermined period may be determined as two times the average amount of time, or the like).

When issuing a voice command to the information processing device 100 after the predetermined period elapses, the wake word is required. As such, the information processing device 100 may output, to the user, how much of the predetermined period has elapsed, that is, may output the amount of elapsed time (for example, a remaining time may be displayed on the display, the remaining time may be announced by speech, the user may be informed by causing the vibrator to vibrate, or the like).

Figure 4:
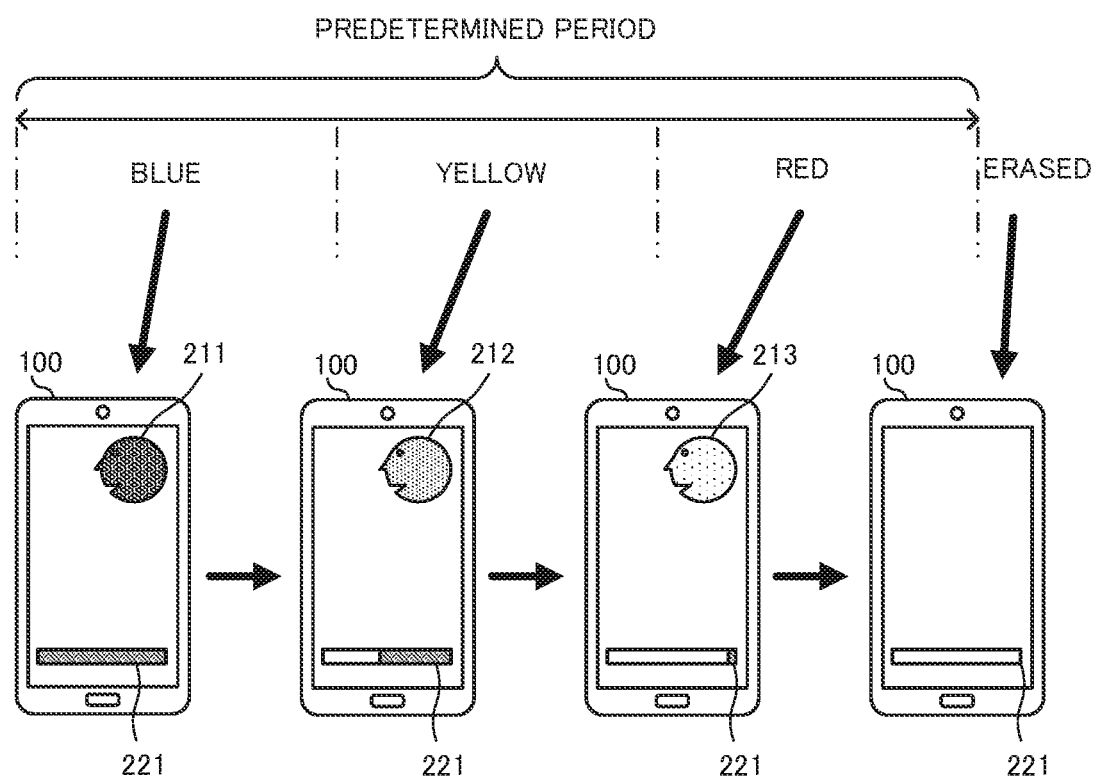
FIG. 4 is a drawing illustrating a display example of elapsed amounts of time in the information processing device according to Embodiment 1.

As illustrated in FIG. 4, the information processing device 100 may output the elapsed amount of time by changing the colors of an icon. For example the information processing device 100 may display, on the display and in accordance with the elapsed amount of time of the predetermined period, a blue icon 211 when only a small amount of the time has elapsed (for example, ⅔ or more remains), a yellow icon 212 when about half of the time has elapsed (for example, the remaining time is from ⅓ to less than ⅔), and a red icon 213 when a large amount of the time has elapsed (for example, the remaining time is less than ⅓). Additionally, as illustrated in FIG. 4, the information processing device 100 may output the elapsed amount of time by displaying, on the display, a time bar 221 for which a length shortens in accordance with the elapsed amount of time of the predetermined period.

Figure 5:
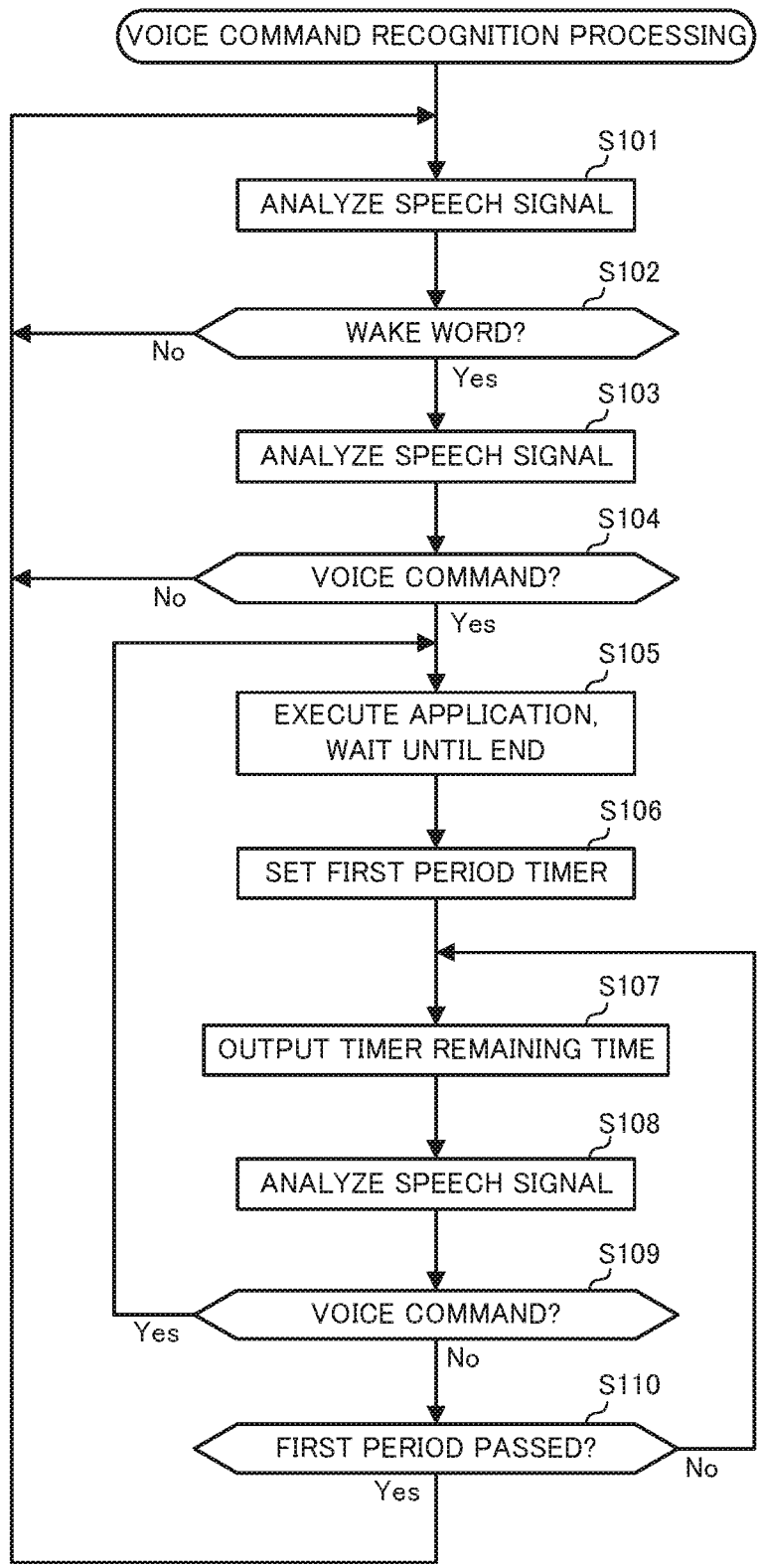
FIG. 5 is an example of a flowchart of voice command recognition processing according to Embodiment 1.

Processing (voice command recognition processing) for enabling acceptance of the voice command without the wake word is described while referencing FIG. 5. This processing starts when the information processing device 100 is started up and preparation for accepting a voice command is completed. This processing is executed in parallel with other processes.

Firstly, the controller 110 acquires and analyzes (voice recognizes) a speech signal from the microphone of the inputter 130 to derive first recognition data (step S101). Then, the controller 110 determines whether the wake word is included in the first recognition data (step S102). When the wake word is not included (step S102; No), step S101 is executed.

When the wake word is included (step S102; Yes), the controller 110 acquires and analyzes (voice recognizes) the speech signal, from the microphone of the inputter 130, uttered by the user after the wake word and derives second recognition data (step S103). Then, the controller 110 determines whether a voice command (control information that is information related to the application program (control processing)) is included in the second recognition data (step S104). When a voice command is not included (step S104; No), step S101 is executed.

When a voice command is included (step S104; Yes), the controller 110 executes an application program (first, the first control processing but, when returning from step S109, the second control processing) corresponding to the voice command in parallel with the voice command recognition processing by multithreading processing, and waits until that execution ends (step S105). Note that, "execution ends" refers to the timer expiring in the case of a timer, and playback to a commanded position (for example, the division with the next step (the next video or movie)) in the case of video playback. That is, "execution ends" means that the command content corresponding to the voice command ends.

Then, the controller 110 sets a timer for which the period to when the timer expires is a first period (step S106). The first period is the predetermined period described above and, in one example, is one minute. Next, the controller 110 outputs the remaining time of the timer by the outputter 140 (step S107). In this step, for example, a display such as the icons 211, 212, 213 and/or the time bar 221 illustrated in FIG. 4 may be performed.

Then, the controller 110 acquires and analyzes (voice recognizes) a speech signal from the microphone of the inputter 130 and derives third recognition data (step S108). Then, the controller 110 determines whether a voice command is included in the third recognition data (step S109). When a voice command is included (step S109; Yes), step S105 is executed. As described above, in step S105, the controller 110 executes an application program (second control processing) corresponding to that voice command. Accordingly, when the controller 110 determines that a voice command (control information) is included in the third recognition data, the controller 110 executes the second control processing regardless of the presence/absence of the wake word in the third recognition data.

When a voice command is not included (step S109; No), the controller 110 determines whether an amount of time measured by the timer has passed the first period (step S110). When the first period is not passed (step S110; No), step S107 is executed. When the first period is passed (step S110; Yes), step S101 is executed.

Note that, in the processing described above, for all voice commands, for the first period after the end of the execution of the application program (started up in accordance with the voice command) corresponding to that voice command, voice commands are accepted without the wake word. However, a configuration is possible in which, for the first period after the end of the execution of the application program, voice commands are accepted without the wake word for only a predetermined voice command. When such a configuration is desired, it is sufficient that, in step S109, the controller 110 performs determination of whether the voice command expressed by the third recognition data is the predetermined voice command.

In the processing described above, the wake word can be omitted in the predetermined period after the end of the execution of the application program executed in accordance with the voice command. However, the condition for being able to omit the wake word is not limited to the predetermined period. For example, a configuration is possible in which the wake word can be omitted in a certain period (may differ from the predetermined period) when the attitude (movement, position) of the information processing device 100 does not change. This is because, in a case in which the user installs the information processing device 100 at an easily viewable angle in a kitchen or the like, when the attitude of the information processing device 100 is the same, it is thought that the user is continuously cooking. Furthermore, whether the user is continuing to perform related work can be determined by detecting movement of the arm of the user or the like. As such, a configuration is possible in which the wake word can be omitted when the related work is being continuously performed, and the wake word cannot be omitted when there is a high possibility that the related work is ended and the user is doing something else.

In the processing described above, in step S105, the controller 110 waits until the end of the execution of the application program, but a configuration is possible in which the controller 110 performs the same processing as step S108 (acquiring the speech signal from the microphone of the inputter 130 and analyzing (voice recognizing) the acquired speech signal, and acquiring the third recognition data) while waiting (during execution of the application program). In such a case, the controller 110 may perform processing (erroneous recognition prevention processing) for ensuring that speech output from the application program during execution (for example, speech output in video playback) is not erroneously recognized as a voice command. Examples of a method of the erroneous recognition prevention processing include a method of adding, to the speech signal from the microphone, speech data of a phase opposite that of the speech data output from the application program (as a result, canceling the speech output from the application program); a method of registering the voice of the user (not limited to one user) in advance, and not accepting voices other than the registered voice as a voice command; and the like.

As described above, in the voice command recognition processing of the present embodiment, the information processing device 100 analyzes a speech signal acquired by the microphone of the inputter 130 and, when the wake word and a voice command are included in the analyzed speech signal, executes an application program corresponding to the speech signal. Moreover, the information processing device 100 can accept voice commands without the wake word for the predetermined period after the detection of the end (for example, the expiration of the timer, or playback stopping due to chapter detection) of the executed application program. Accordingly, uttering the wake word can be omitted when the user issues a command to the information processing device 100.

Embodiment 2

In Embodiment 1, the user can omit utterance of the wake word after the end of the operation of the application program executed in accordance with the voice command. Next, Embodiment 2, in which the content to be uttered by the user can be omitted in accordance with data (a speech signal, text data, and the like) output by the application program, is described.

Figure 6:
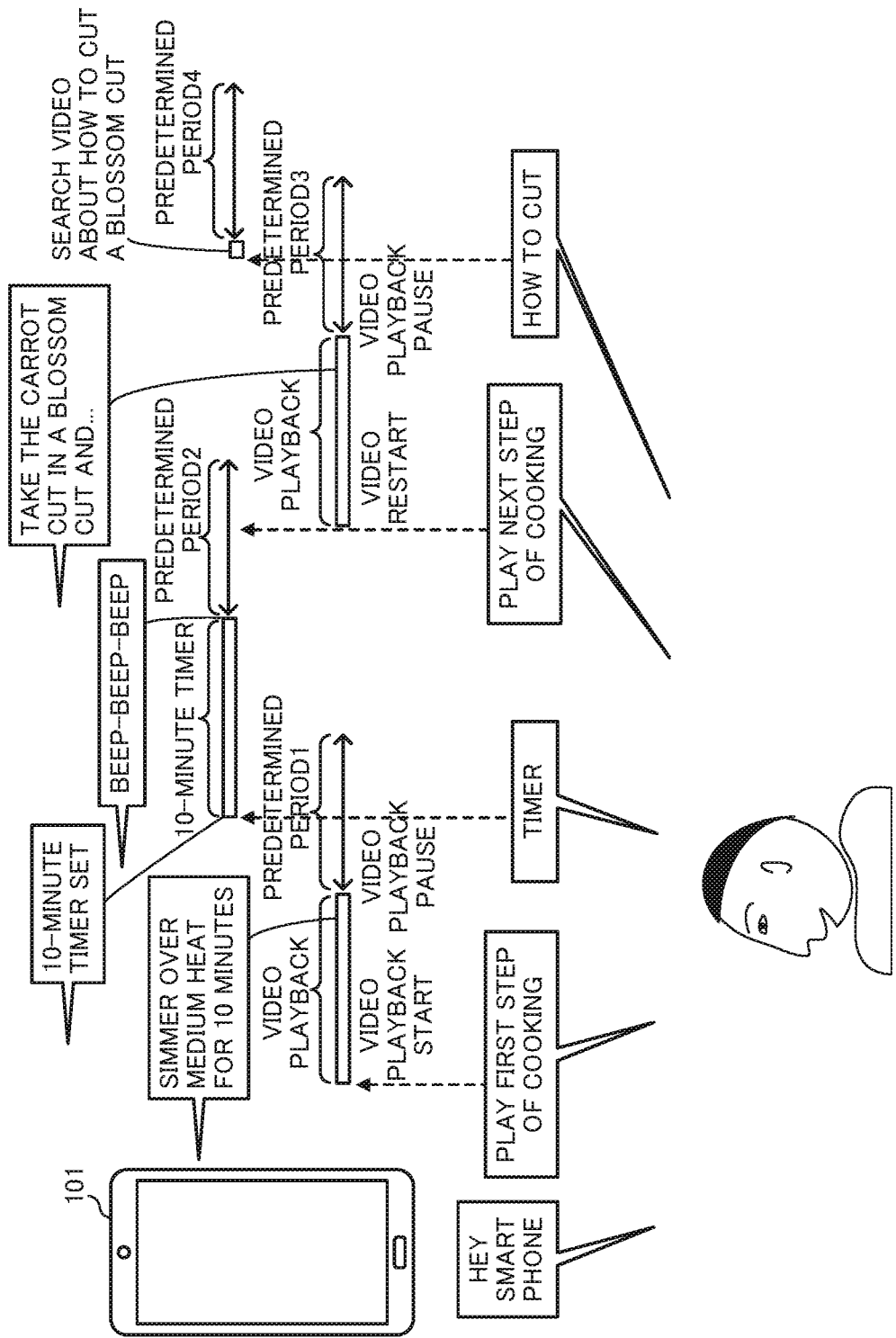
FIG. 6 is a drawing illustrating an example of operations when a user issues commands, by voice, to an information processing device according to Embodiment 2.

For example, in the example illustrated in FIG. 6, the user first utters the wake word, and then utters "play the first step of the cooking." As a result, an information processing device 101 according to Embodiment 2 starts playback of a video portion, of an instructional video of the cooking, corresponding to the first step. Then, the controller 110 of the information processing device 101 recognizes speech being output by that video. In this example, it is assumed that there is a procedure of simmering over medium heat for 10 minutes, and that there is speech stating "simmer over medium heat for 10 minutes." As such, the controller 110 extracts "10 minutes", which is a parameter expressing an "amount of time", from speech data acquired by voice recognizing the speech signal output during video playback, and stores the extracted parameter in the storage 120.

Then, when the controller 110 detects a chapter provided at the end point of the video portion corresponding to the first step, the controller 110 pauses the playback of the video. Then, the controller 110 accepts the next command without the wake word for a predetermined period (predetermined period 1) after the pausing. It is assumed that, in order to perform work in accordance with the procedure of the instructional video, the user issues a command, by voice, of "timer" to the information processing device 101 in the predetermined period 1 (for example, at the point in time at which the simmering begins). As such, the controller 110 applies the "10 minutes" that is the parameter voice recognized from in the video, to the timer application program started up in accordance with the voice command, and a 10-minute timer is set.

Then, after the 10 minutes elapse, the controller 110 emits a sound of beep-beep-beep to notify the user that 10 minutes have elapsed, and accepts the next command without the wake word for a predetermined period (predetermined period 2) after the end of the execution of the timer. In this example, the user issues, without the wake word, a command of "play the next step of the cooking", and the controller 110 accepts that command and starts playback of a video portion, of the instructional video of the cooking, corresponding to the next step (second step).

It is assumed that, in the instructional video, there is a procedure for cutting a carrot in a style called "blossom cut", and there is speech that states "take the carrot cut in a blossom cut and . . . ". As such, the controller 110 extracts "blossom cut", which is a parameter expressing the "Name of way to cut vegetable", from the speech data acquired by voice recognizing the speech signal output during video playback, and stores the extracted data in the storage 120.

Then, when the controller 110 detects a chapter provided at the end point of the video portion corresponding to the second step, the controller 110 pauses the playback of the video. Then, the controller 110 accepts the next command without the wake word for a predetermined period (predetermined period 3) after the pausing. It is assumed that the user desires to learn how to perform the blossom cut in order to perform the work in accordance with the procedure of the instructional video. Then, when, in the predetermined period 3, the user issues a command of "how to cut" to the information processing device 101, the controller 110 applies "blossom cut", which is a parameter that is speech recognized in the video, to a video search application program started up in accordance with the voice command, and searches for a video about "how to cut a blossom cut." Then, the controller 110 accepts the next command without the wake word in a predetermined period (predetermined period 4) after the search.

Thus, in the information processing device 101 of Embodiment 2, not only can the wake word be omitted but, also, the parameter (control parameter) to be applied to the application program (control processing) corresponding to the voice command can be automatically acquired.

The functional configuration of the information processing device 101 according to Embodiment 2 is the same as the functional configuration of the information processing device 100 according to Embodiment 1, as illustrated in FIG. 1. However, the storage 120 of the information processing device 101 includes a parameter buffer that is a buffer (storage area) for temporarily storing an extraction parameter table 121 and the parameter to be applied to the application program (control processing). Parameters and the like extracted, as parameters, from data (the speech signal, text data, and the like) output from the application program started up in accordance with a voice command are stored in the extraction parameter table 121. Additionally, parameters (amounts of time, and the like) extracted from the data (the speech data, text data, and the like) in voice command recognition processing described later are stored in the parameter buffer.

As illustrated in FIG. 7, an "Extraction parameter" (parameter extracted from the data (the speech data, text data, and the like) output by the application program started up in accordance with a voice command), a "User speech" (voice command uttered by the user after the execution of the application program started up in accordance with a voice command), and a "Start up application" (application program started up by applying the "Extraction parameter" when the "User speech" is uttered) are defined in the extraction parameter table 121.

For example, the "Extraction parameter" of "Amount of time", the "User speech" of "Timer", and the "Start up application" of "Timer for that amount of time" are associated and defined in FIG. 7. When the user utters "Timer", the controller 110 determines whether the "Amount of time" (10 minutes in FIG. 6), which is a type of parameter, is stored in the parameter buffer. When, as a result of the determination, the controller 110 determines that a parameter corresponding to the "Amount of time" is stored in the parameter buffer, the controller 110, on the basis of the extraction parameter table 121, starts up the timer as the application, sets the parameter (10 minutes), and starts the timer.

Additionally, the "extraction parameter" of "Name of way to cut vegetable", the "user speech" of "How to cut", and the "Start up application" of "Video search of that way to cut vegetable" are associated in the next row in FIG. 7 When the user utters "how to cut", the controller 110 determines whether the "Name of way to cut vegetable" (blossom cut in FIG. 6), which is a type of parameter, is stored in the parameter buffer. When, as a result of the determination, the controller 110 determines that a parameter (for example, blossom cut) corresponding to the "Name of way to cut vegetable" is stored in the parameter buffer, the controller 110, on the basis of the extraction parameter table 121, starts up a video search as the application, sets the parameter (blossom cut) as a search keyword, and starts a search for a video. Note that, in this example, the "Name of way to cut vegetable" is defined as the "Extraction parameter", but the present disclosure is not limited to such a definition. For example, the basic ways to cut vegetables (thin slicing, round slicing, half-moon slicing, and the like) and the decorative cuts (flower blossom and the like) are limited and, as such, the extraction parameter table 121 may be configured to individually define the specific name of the way to cut as the "Extraction parameter."

The same applies for the other examples illustrated in FIG. 7, but this is merely an example of the extraction parameter table 121 and the extraction parameter table 121 may be expanded or modified as desired.

As described above, when, in the data (the speech signal, text data, or the like) output from the application executed in accordance with a voice command, there is a parameter related to an item defined as an extraction parameter in the extraction parameter table 121, the controller 110 stores that parameter in the parameter buffer. Moreover, the controller 110 determines whether a parameter, corresponding to the voice command (information related to the application program) uttered by the user, is stored in the parameter buffer. When a parameter corresponding to the voice command is stored in the parameter buffer, the controller 110 reads out the parameter, applies, on the basis of the extraction parameter table 121, the parameter to the application program corresponding to the voice command and starts up the application program (starts a timer for a set amount of time, searches for a video with a specific keyword, or the like). As a result, the information processing device 101 eliminates the need for the wake word for utterances of the user to the information processing device 101 in a predetermined period after the execution of the application program in accordance with the voice command and, also, enables the omission of the content of the parameter (the amount of time, name, or the like) that typically must be included in the voice command.

Figure 8:
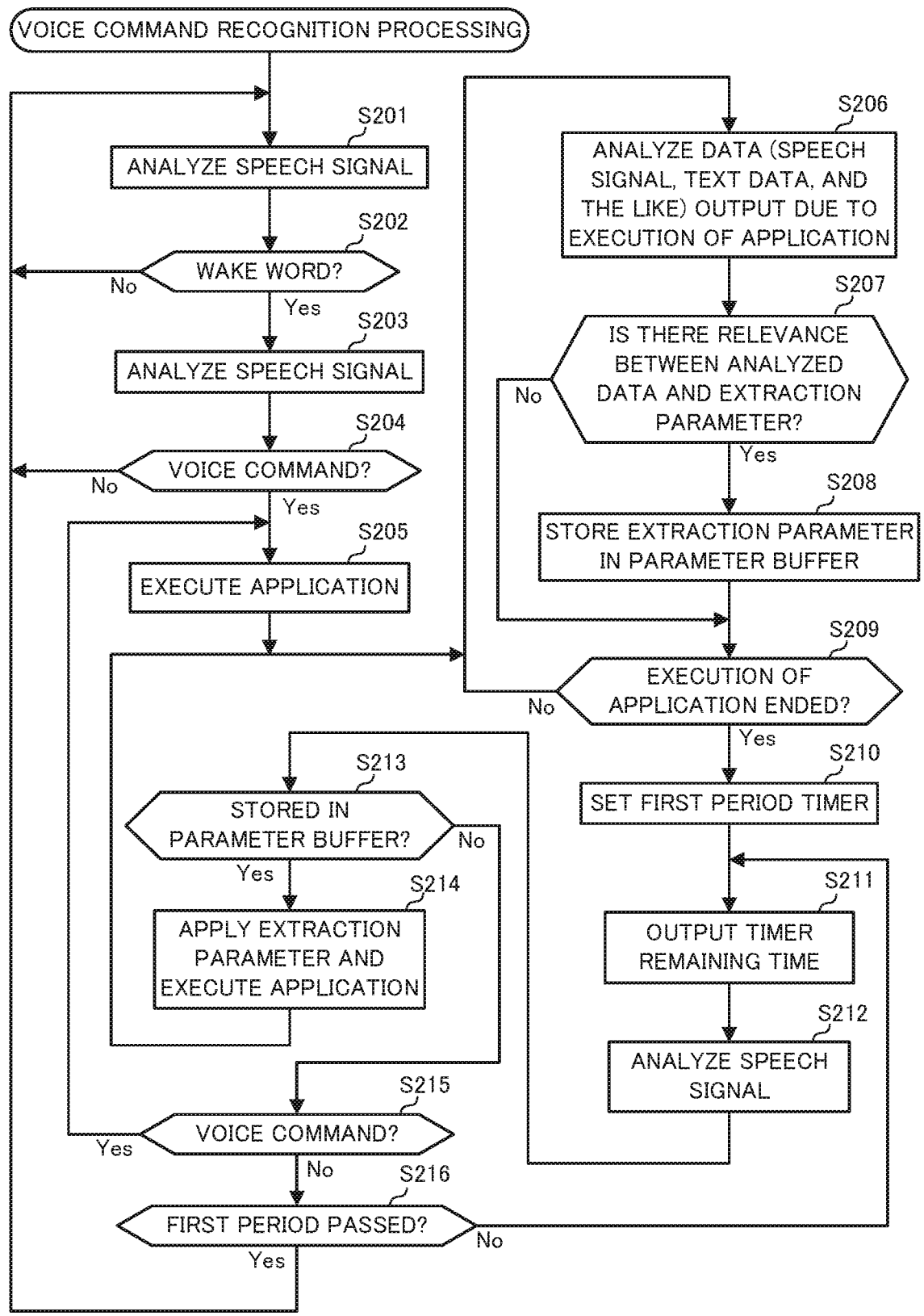
FIG. 8 is an example of a flowchart of voice command recognition processing according to Embodiment 2.

Voice command recognition processing according to Embodiment 2 is described while referencing FIG. 8. This processing starts when the information processing device 101 is started up and preparation for accepting a voice command is completed. This processing is executed in parallel with other processes.

Firstly, the processing from step S201 to step S204 is the same as the processing of step S101 to step S104 of the voice command recognition processing according to Embodiment 1 (FIG. 5) and, as such, description thereof is omitted.

In step S205, the controller 110 starts up an application program corresponding to a voice command and executes the application program in parallel with the voice command recognition processing by multithreading processing. Then, the controller 110 analyzes (recognizes), as first output information, the data (output data such as the speech signal, text data, or the like) output as a result of the application program being executed (step S206).

Then, the controller 110 determines whether there is relevance between a word included in the first output information and the content of the items defined as the extraction parameters in the extraction parameter table 121 (step S207). Note that, the determination of whether there is relevance is carried out for all of the defined extraction parameters. Specifically, in the extraction parameter table 121 of FIG. 7, a determination is made of whether there is relevance with all 11 items including the "Amount of time", the "Name of way to cut vegetable", and the like. When it is determined that there is no relevance (step S207; No), step S209 is executed.

Here, there being relevance means that a word included in the first output information is related to an item defined as an extraction parameter in the extraction parameter table 121. That is, a determination is made that there is relevance not only cases in which a word included in the first output information completely matches an item defined as an extraction parameter, but also cases in which a word matches to a certain degree (tolerance), such as a synonym or a dialect. As one example of a case in which a word included in the first output information matches to a certain degree, the vegetable "daikon" matches "daekuni", the word for "daikon" in the Okinawan dialect. Likewise, objects that have modern and historical names such as "ruler" and "measuring stick", objects for which a nickname has relatively high name recognition such as "product or service name" and "nickname of product or service name", objects for which a shortened name has relatively high name recognition such as "produce or service name" and "shortened name of product or service name", and the like match.

When it is determined that there is relevance between a word included in the first output information and an item defined as an extraction parameter (step S207; Yes), the controller 110 stores the word included in the first output information in the parameter buffer of the storage 120 as an extraction parameter (step S208), and executes step S209.

In step S209, the controller 110 determines whether the execution of the application program, for which execution is started in step S205, has ended. When the execution has not ended (step S209; No), the controller 110 executes step S206.

When the execution of the application program has ended (step S209; Yes), the controller 110 executes step S210. The processing of step S210 to step S212 is the same as the processing of step S106 to step S108 of the voice command recognition processing according to Embodiment 1 (FIG. 5) and, as such, description thereof is omitted.

In step S213, the controller 110 determines whether a parameter corresponding to the third recognition data acquired in step S212 is stored in the parameter buffer. When the controller 110 determines that a parameter corresponding to the third recognition data is not stored in the parameter buffer (step S213; No), the controller 110 cannot execute the application defined in the extraction parameter table 121 using the third recognition data and the parameter stored in the parameter buffer and, as such, executes step S215.

When the extraction parameter and the third recognition data exist in the extraction parameter table 121 (step S213; Yes), the controller 110 determines that the extraction parameter (control parameter) can be applied to the application program (second control processing) defined as the "Start up application" in the extraction parameter table 121, and executes the application program in parallel with the voice command recognition processing by multithreading processing (step S214). Then, the controller 110 executes step S206.

The processing of step S215 and step S216 is the same as the processing of step S109 and step S110 of the voice command recognition processing according to Embodiment 1 (FIG. 5) and, as such, description thereof is omitted.

Due to the voice command recognition processing described above, when, in the data (the speech signal, text data, or the like) output from the application executed in accordance with the voice command, there is a parameter related to an item defined as an extraction parameter in the extraction parameter table 121, the controller 110 stores that parameter in the parameter buffer. Moreover, the controller 110 determines whether a parameter corresponding to the voice command (information related to the application program) uttered by the user is stored in the parameter buffer. When a parameter corresponding to the voice command is stored in the parameter buffer, the controller 110 reads out the parameter, applies, on the basis of the extraction parameter table 121, the parameter to the application program corresponding to the voice command, and executes the application program. As a result, the information processing device 101 can eliminate the need for the wake word for utterances of the user to the information processing device 101 for the predetermined period after the execution of the application program in accordance with the voice command and, also, can start up an appropriate application program in accordance with a voice command in which specification of a parameter is omitted.

Note that, in Embodiment 2 described above, an example is described in which the parameter (extraction parameter) stored in the parameter buffer is extracted by analyzing the data output from the application program, but the present disclosure is not limited thereto. For example, a configuration is possible in which, when executing an application program for video playback in accordance with a voice command, instead of or in addition to the extraction parameter obtained by analyzing the speech output by the video playback, text data provided in the video (a hashtag or the like), text data obtained by recognizing text from an image, or the like may be used as the extraction parameter.

Additionally, in Embodiment 2 described above, the controller 110 executes the application program after recognizing that the user has uttered a voice command. However, a configuration is possible in which the controller 110 predicts, in accordance with a parameter stored in the parameter buffer, the application program to be started up next, and starts up the predicted application program in advance in the background. As a result, the application program can instantaneously respond after the user utters the voice command. In such a case, when the voice command is not uttered even though a predetermined period has elapsed, the controller 110 automatically ends the application program started up in the background.

Embodiment 3

In Embodiment 2, the effort of uttering by the user is omitted by using the parameter extracted from the data output by the application program. Next, Embodiment 3, in which the content uttered by the user can be omitted on the basis of an action of the user, is described.

For example, in the example illustrated in FIG. 9, the user first utters the wake word and, then, utters "read text message out loud." As a result, an information processing device 102 according to Embodiment 3 reads the content of a received text message out loud. Moreover, the controller 110 of the information processing device 102 analyzes the text data of that text message. In this example, it is assumed that an address of a meeting location is included in the text message. As such, the controller 110 extracts, from the text message, "1-2-3 YY, ZZ ward, Tokyo", which is the parameter of "Address, location name, facility name, or the like", and stores the extracted parameter in the storage 120. Note that, specifically, the controller 110 stores the extracted parameter in the parameter buffer on the basis of the data output from the application program and the extraction parameter table 121, in the same manner as in Embodiment 2.

The controller 110 completes the reading of the text message out loud and accepts a next command without the wake word in a predetermined period (predetermined period 1) thereafter. It is assumed that the user desires to go to the location of the address written in the text message, and issues the command "Map" in order to start up an application program for map displaying and/or navigation. As a result, the controller 110 applies the address "1-2-3 YY, ZZ ward, Tokyo" of the meeting location that is the parameter extracted from the text message, to the map display application program started up in accordance with the voice command, and a map of the area near the address is displayed.

Then, the controller 110 monitors the actions of the user in a predetermined period (predetermined period 2) after the map is displayed. In this example, the user starts a movement to the meeting location. As a result, the controller 110 again accepts the next command without the wake word in a predetermined period (predetermined period 3) after the movement of the user is detected. In this example, the user issues the command "Balance" without the wake word, and the controller 110 accepts this command, starts up an application program of a transportation IC card, and outputs "2500 yen."

Then, the controller 110 monitors the actions of the user for a predetermined period (predetermined period 4) after the output. In this example, the user uses the IC card to exit a train platform. As a result, the controller 110 accepts the next command without the wake word in a predetermined period (predetermined period 5) after the user uses the IC card. In this example, the user issues a command of "Send text message" without the wake word, and the controller 110 accepts this command and uses an application program for text messaging to send a text message notifying that the user has exited the train station.

Thus, in Embodiment 3, not only can the wake word be omitted, but the actions of the user are monitored and application programs predicted on the basis of those actions can be started up.

The functional configuration of the information processing device 102 according to Embodiment 3 is the same as the functional configuration of the information processing device 101 according to Embodiment 2, as illustrated in FIG. 1. However, the storage 120 of the information processing device 102 includes storage areas for an action table 122 and an action buffer in addition to the storage areas for the extraction parameter table 121 and the parameter buffer of the information processing device 101. User actions and the like related to applications for which execution is ended are stored in the action table 122. The action buffer is a buffer in which a detected user action is stored.

As illustrated in FIG. 10, an "Execution ended application" (application program started up in accordance with a voice command and for which execution is ended), a "User action" (action of the user predicted to be performed after the execution of the "Execution ended application" is ended), a "User speech" (voice command predicted to be uttered by the user after the "User action"), and a "Start up application" (application program started up on the basis of the "User action" and/or the "User speech" when the "User speech" is uttered) are defined in the action table 122.

For example, in FIG. 10, the "Execution ended application" is defined as "Map", the "User action" is defined as "Movement or navigation start", the "User speech" is defined as "Balance", and the "Start up application" is defined as "Balance output (of transportation IC card)." Typically, it is thought that the balance is output by some sort of IC card application in response to the voice command "Balance" but, among IC card applications, there are shopping applications used at convenience stores and other chains, and transportation applications used by transportation companies. In this example, the "Execution ended application" is "Map" and the "User action" is "Movement or navigation start" and, as such, the IC card to be used is predicted to be a transportation IC card, and the controller 110 performs output of the balance of the transportation IC card.

Additionally, in the next row of FIG. 10, the "Execution ended application" is defined as "Balance output", the "User action" is defined as "IC card use", the "User speech" is defined as "Send text message", and the "Start up application" is defined as "Send text message (that user has exited train station)." Typically, there are various possibilities for the type of text message sent in response to the voice command "Send text message" but, in this example, the "Execution ended application" is "Balance output" and the "User action" is "IC card use" and, as such, it is predicted that the user uses an IC card to exit through the gates of the train station, and the controller 110 sends a text message informing that the user has exited the train station.

Information not defined in the action table 122 (in this example, the destination of the text message) may be set on the basis of a history of application programs started up to-date. For example, in the example illustrated in FIG. 9, the process starts from the receipt of the text message by the information processing device 102 and, as such, the controller 110 may set the destination of the text message to be sent last in the form of a reply (or a reply to all including carbon copied (CC) recipients) to the text message received first.

Thus, by using the action table 122, the controller 110 can determine the application program to be started up next on the basis of information, about what application programs have been executed and what the actions and speech of the user have been to those application programs. As a result, the efforts of the user can be further reduced. Note that the action table 122 illustrated in FIG. 10 is merely an example, and may be expanded or modified as desired.

In Embodiment 3, not only can uttering of the wake word by the user be omitted but, due to the action table 122, the application program can be started up by content that takes the actions of the user into consideration.

Figure 11:
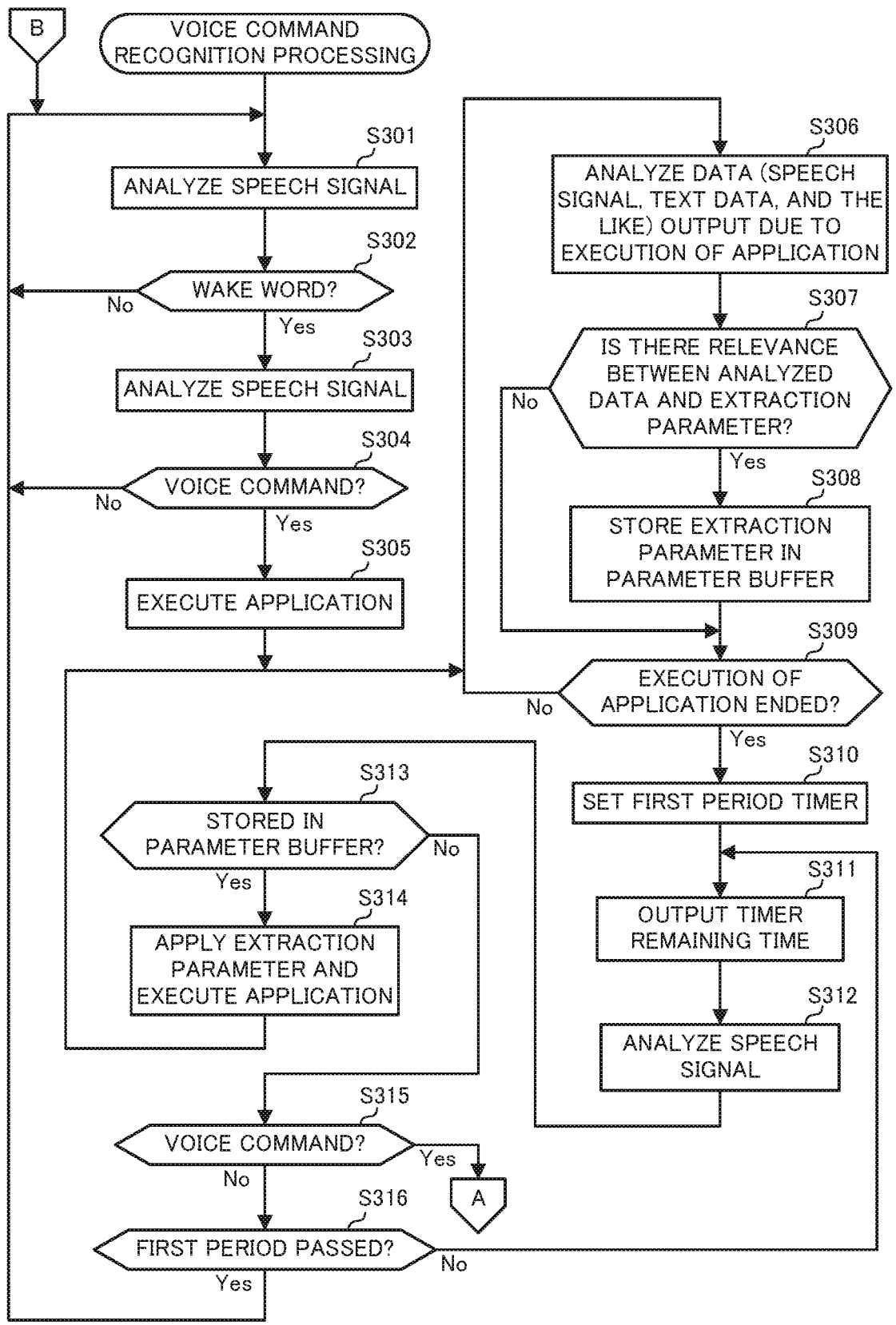
FIG. 11 is an example of a first portion of a flowchart of voice command recognition processing according to Embodiment 3.
Figure 12:
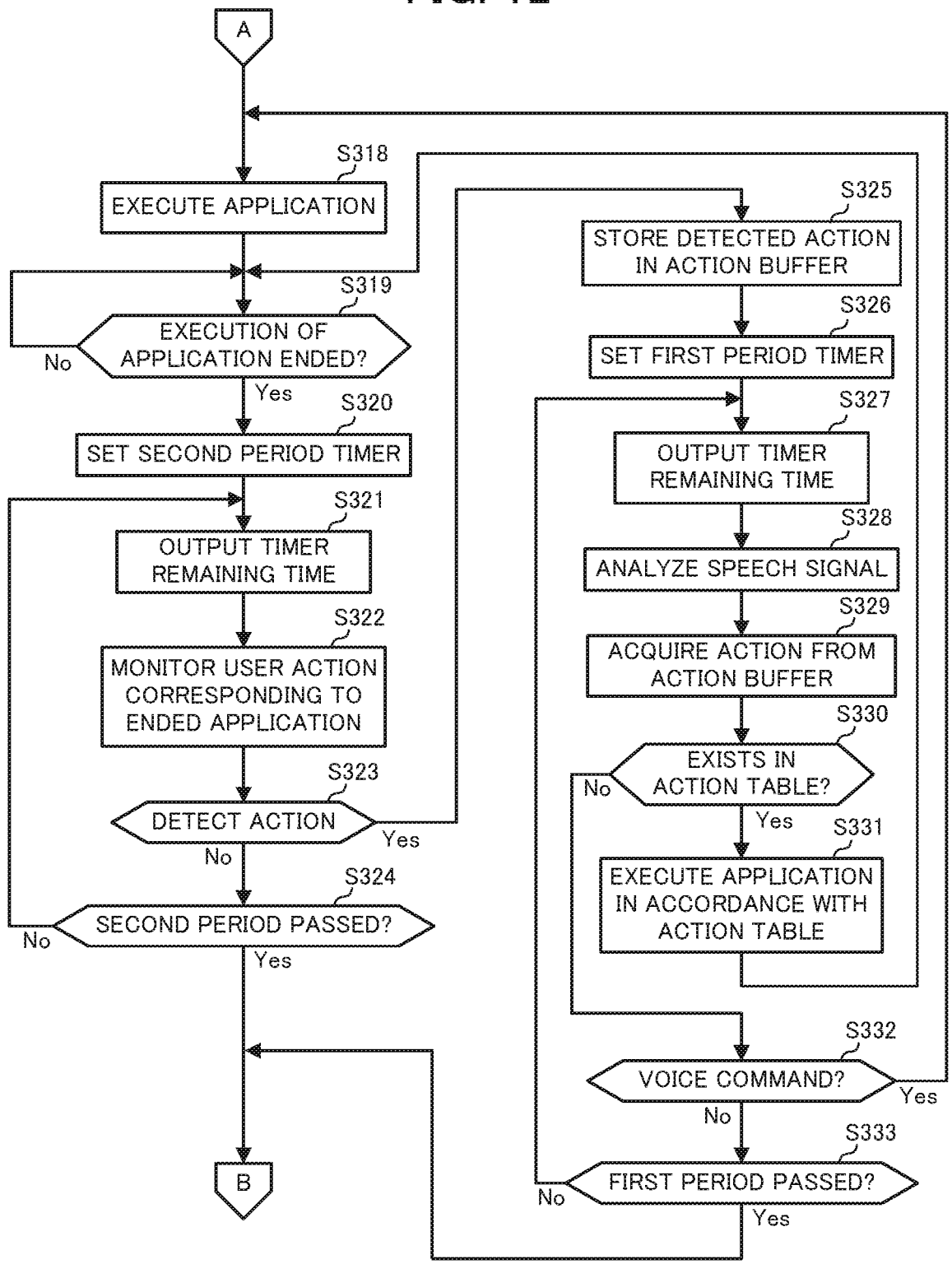
FIG. 12 is an example of a second portion of the flowchart of the voice command recognition processing according to Embodiment 3.

Voice command recognition processing according to Embodiment 3 is described while referencing FIGS. 11 and 12. This processing starts when the information processing device 102 is started up and preparation for accepting a voice command is completed. This processing is executed in parallel with other processes.

Firstly, of the processing of step S301 to step S316 (the processing illustrated in FIG. 11), all except the processing of step S315 is the same as the processing of step S201 to step S216 (except step S215) of the voice command recognition processing according to Embodiment 2 (FIG. 8) and, as such, description thereof is omitted.

In step S315, the controller 110 determines whether a voice command is included in the third recognition data. When a voice command is not included (step S315; No), step S316 is executed, which is the same as in Embodiment 2. When a voice command is included (step S315; Yes), the processing continues to FIG. 12, and the controller 110 executes the application program (second control processing), started up in accordance with the voice command, in parallel with the voice command recognition processing by multithreading processing (step S318).

Then, the controller 110 determines whether the execution of the application program started up in step S318 or step S331 has ended (step S319). When the execution has not ended (step S319; No), step S319 is executed and the controller 110 waits until the execution has ended.

When the execution of the application program has ended (step S319; Yes), the controller 110 sets a timer in which a period to when the timer expires is a second period (step S320). The second period is the predetermined period described above for monitoring the actions of the user and, in one example, is 10 minutes. Then, the controller 110 outputs the remaining time of the timer using the outputter 140 (step S321). In this step, for example, a display such as the icons 211, 212, 213 and/or the time bar 221 illustrated in FIG. 4 may be performed. Additionally, the method of outputting (output mode (displaying, speech outputting, vibrating, or the like), color, size, and the like of font, icon, time bar, and the like) may be changed to the method of outputting of steps S311 and S327 to distinguish from the timer of the first period (predetermined period in which the wake word can be omitted).

Next, the controller 110 references the action table 122, monitors the user action corresponding to the application program for which execution ended in step S319 (step S322), and determines whether the user action is detected (step S323).

When the user action is not detected (step S323; No), the controller 110 determines whether an amount of time measured by the timer has passed the second period (step S324). When the measured amount of time has not passed the second period (step S324; No), step S321 is executed. When the measured amount of time has passed the second period (step S324; Yes), step S301 is executed.

Meanwhile, when the user action is detected (step S323; Yes), the controller 110 stores the detected action to the action buffer in the storage 120 (step S325).

Then, the controller 110 sets a timer for which the period to when the timer expires is a first period (step S326). The first period is the predetermined period described above in which the user can omit the wake word and, in one example, is ten minutes. Next, the controller 110 outputs the remaining time of the timer by the outputter 140 (step S327). In this step, for example, a display such as the icons 211, 212, 213 and/or the time bar 221 illustrated in FIG. 4 may be performed.

Then, the controller 110 acquires a speech signal from the microphone of the inputter 130 and analyzes (voice recognizes) the acquired speech signal to acquire the third recognition data (step S328). Next, the controller 110 acquires the user action stored in the action buffer (step S329). Then, the controller 110 determines whether a voice command is included in the third recognition data and, also, whether each of the user action acquired in step S329 and the voice command included in the third recognition data exist in the action table 122 as the "User action" and the "User speech" (step S330). Note that, in this determination, as in step S207 of the voice command recognition processing of Embodiment 2 (FIG. 8) described above, when there is relevance between each of the user action in the action buffer and the voice command in the third recognition data and the "User action" and the "User speech" of the action table 122, a determination may be made that the user action and the user speech each exist in the action table 122.

When the user action and the voice command exist in the action table 122 (step S330; Yes), the controller 110 executes, in accordance with the action table 122, the application program (second control processing) defined as the "Start up application" corresponding to the "User action" and the "User speech", in parallel with the voice command recognition processing by multithreading processing (step S331), and then executes step S319.

Note that the "Start up application" of the action table 122 includes not only the application program to be started up, but also information about what parameter to apply on the basis of the corresponding "User action" and "User speech" when starting up. Accordingly, in step S331, the controller 110 can execute the application program by applying an appropriate parameter on the basis of the information about the "Start up application" defined in the action table 122.

When a voice command is not included in the third recognition or the user action acquired in step S329 and the voice command included in the third recognition data do not exist in the action table 122 (step S330; No), the controller 110 determines whether a voice command is included in the third recognition data (step S332). When a voice command is included (step S332; Yes), step S318 is executed.

When a voice command is not included (step S332; No), the controller 110 determines whether the amount of time measured by the timer has passed the first period (step S333). When the first period is not passed (step S333; No), step S327 is executed. When first period is passed (step S333; Yes), step S301 is executed.

Due to the voice command recognition processing described above, when the user performs an action corresponding to a "User action" defined in the action table 122, not only can the user omit the wake word but, also, an appropriate application program matching the action content of the user can be started up.

Other Modified Examples

Note that the information processing device 100 is not limited to a smartphone, and can be realized by a smartwatch provided with the sensor 160, or a computer such as a portable tablet, personal computer (PC), or the like. Specifically, in the embodiments described above, examples are described in which the program of the voice command recognition processing executed by the controller 110 is stored in advance in the storage 120. However, a computer may be configured that is capable of executing the various processings described above by storing and distributing the programs on a non-transitory computer-readable recording medium such as a compact disc read-only memory (CD-ROM), a digital versatile disc (DVD), a magneto-optical, disc (MO), a memory card, and a USB memory, and reading out and installing these programs on the computer.

Furthermore, the program can be superimposed on a carrier wave and applied via a communication medium such as the internet. For example, the program may be posted to and distributed via a bulletin board system (BBS) on a communication network. Moreover, a configuration is possible in which the various processings described the above are executed by starting the programs and, under the control of the operating system (OS), executing the programs in the same manner as other application programs.

Additionally, a configuration is possible in which the controller 110 is constituted by a desired processor unit such as a single processor, a multiprocessor, a multi-core processor, or the like, or by combining these desired processors with processing circuitry such as an application specific integrated circuit (ASIC), a field-programmable gate array (FPGA), or the like.

As described above, the information processing device according to the various embodiments described above can perform various processings without the wake word when a predetermined condition related to an event that occurs after the wake word is satisfied. Here, the predetermined condition related to an event that occurs after the wake word is satisfied by, for example, acquisition of a voice command, pausing of processing of an application program, ending, such as ending the execution of the first control processing, detection of a predicted action such as movement detection of the user or the like, expiration of a timer, and the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. An information processing device comprising:
a microphone that acquires a speech signal; and
at least one processor, wherein
in a case in which the processor determines that a wake word is included in first recognition data derived from the speech signal,
when the processor determines that control information, that is information related to a control processing, is included in second recognition data derived from the speech signal after the wake word, the processor executes a first control processing corresponding to the control information,
when the processor determines that the control information is included in third recognition data derived from the speech signal acquired by the microphone during a first period after a predetermined condition related to an event that occurs after the wake word is satisfied or during execution of the first control processing, the processor executes a second control processing corresponding to the control information included in the third recognition data even when the wake word is not included in the third recognition data, and
when the processor determines that a control parameter related to a control processing is included in first output information output as a result of the first control processing being executed, the processor applies the control parameter at a time of execution of the second control processing.

2. The information processing device according to claim 1, wherein the predetermined condition is satisfied when the execution of the first control processing ends.

3. The information processing device according to claim 1, wherein
the processor determines whether there is relevance between information included in the first output information and information included in a parameter table, and
when the processor determines that there is relevance, the processor determines that the control parameter is included in the first output information.

4. The information processing device according to claim 1, wherein
the processor predicts, based on the second control processing, an action of a user after the second control processing,
the predetermined condition is satisfied when the execution of the first control processing ends or the predicted action is detected, and
in a case in which the processor detects that the user performs the estimated action during a second period after execution of the second control processing ends, when the processor determines that the third recognition data, derived from the speech signal acquired by the microphone during the first period after detection, is included in the control information, the processor further executes a new second control processing corresponding to the control information included in the third recognition data.

5. The information processing device according to claim 4, wherein
the processor predicts, based on the second control processing and an action table, the action of the user,
in a case in which the processor detects that the user performs the estimated action during the second period after the execution of the second control processing ends, the processor determines whether there is relevance between the control information included in the third recognition data, derived from the speech signal acquired by the microphone during the first period after detection, and information included in the action table, and
when the processor determines that there is relevance, the processor executes a new second control processing corresponding to the control information included in the third recognition data.

6. The information processing device according to claim 1, wherein
the processor outputs an elapsed amount of time from a start to an end of the first period.

7. An information processing method for an information processing device including a microphone that acquires a speech signal, and at least one processor, the method comprising:
in a case in which the processor determines that a wake word is included in first recognition data derived from the speech signal,
when the processor determines that control information, that is information related to a control processing, is included in second recognition data derived from the speech signal after the wake word, executing, by the processor, a first control processing corresponding to the control information;
when the processor determines that the control information is included in third recognition data derived from a speech signal acquired by the microphone during a first period after a predetermined condition related to an event that occurs after the wake word is satisfied or during execution of the first control processing, executing, by the processor, a second control processing corresponding to the control information included in the third recognition data even when the wake word is not included in the third recognition data; and
when the processor determines that a control parameter related to a control processing is included in first output information output as a result of the first control processing being executed, the processor applies the control parameter at a time of execution of the second control processing.

8. The information processing method according to claim 7, wherein the predetermined condition is satisfied when the execution of the first control processing ends.

9. The information processing method according to claim 7, wherein
the processor determines whether there is relevance between information included in the first output information and information included in a parameter table, and
when the processor determines that there is relevance, the processor determines that the control parameter is included in the first output information.

10. The information processing method according to claim 7, wherein
the processor predicts, based on the second control processing, an action of a user after the second control processing,
the predetermined condition is satisfied when the execution of the first control processing ends or the predicted action is detected, and
in a case in which the processor detects that the user performs the estimated action during a second period after execution of the second control processing ends, when the processor determines that the third recognition data, derived from the speech signal acquired by the microphone during the first period after detection, is included in the control information, the processor further executes a new second control processing corresponding to the control information included in the third recognition data.

11. The information processing method according to claim 10, wherein
the processor predicts, based on the second control processing and an action table, the action of the user,
in a case in which the processor detects that the user performs the estimated action during the second period after the execution of the second control processing ends, the processor determines whether there is relevance between the control information included in the third recognition data, derived from the speech signal acquired by the microphone during the first period after detection, and information included in the action table, and
when the processor determines that there is relevance, the processor executes a new second control processing corresponding to the control information included in the third recognition data.

12. The information processing method according to claim 7, wherein the processor outputs an elapsed amount of time from a start to an end of the first period.

13. A non-transitory recording medium storing a program that causes a processor of an information processing device including a microphone that acquires a speech signal, and at least one processor to execute processing for
in a case in which the processor determines that a wake word is included in first recognition data derived from the speech signal,
when the processor determines that control information, that is information related to a control processing, is included in second recognition data derived from the speech signal after the wake word, executing, by the processor, a first control processing corresponding to the control information;
when a determination is made that the control information is included in third recognition data derived from a speech signal acquired by the microphone during a first period after a predetermined condition related to an event that occurs after the wake word is satisfied or during execution of the first control processing, executing, by the processor, a second control processing corresponding to the control information included in the third recognition data even when the wake word is not included in the third recognition data; and when the processor determines that a control parameter related to a control processing is included in first output information output as a result of the first control processing being executed, applying, by the processor, the control parameter at a time of execution of the second control processing.

* * * * *